(12) United States Patent  
Friedrichs et al.

(10) Patent No.: US 9,100,425 B2  
(45) Date of Patent: Aug. 4, 2015

(54) METHOD AND APPARATUS FOR DETECTING MALICIOUS SOFTWARE USING GENERIC SIGNATURES

(75) Inventors: Oliver Friedrichs, Woodside, CA (US); Alfred Huger, Calgary (CA); Adam J. O'Donnell, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 13/308,522

(22) Filed: Nov. 30, 2011

(65) Prior Publication Data

US 2012/0210422 A1 Aug. 16, 2012

Related U.S. Application Data

(60) Provisional application No. 61/418,532, filed on Dec. 1, 2010, provisional application No. 61/418,514, filed on Dec. 1, 2010, provisional application No. 61/418,547, filed on Dec. 1, 2010, provisional application No. 61/418,580, filed on Dec. 1, 2010.

(51) Int. Cl.
*G06F 21/56* (2013.01)
*H04L 29/06* (2006.01)
*G06F 21/44* (2013.01)

(52) U.S. Cl.
CPC .......... *H04L 63/1416* (2013.01); *G06F 21/564* (2013.01)

(58) Field of Classification Search
CPC ............................ H04L 63/1441; G05F 21/56
See application file for complete search history.

(56) References Cited

U.S. PATENT DOCUMENTS

| | | | |
|---|---|---|---|
| 8,347,386 B2 * | 1/2013 | Mahaffey et al. | 726/23 |
| 8,365,283 B1 * | 1/2013 | Satish et al. | 726/23 |
| 2006/0037080 A1 | 2/2006 | Maloof | |
| 2006/0126522 A1 | 6/2006 | Oh | |
| 2007/0016953 A1 | 1/2007 | Morris et al. | |
| 2009/0038011 A1 * | 2/2009 | Nadathur | 726/24 |
| 2009/0049549 A1 | 2/2009 | Park et al. | |
| 2009/0187992 A1 * | 7/2009 | Poston | 726/24 |
| 2009/0248696 A1 | 10/2009 | Rowles et al. | |

(Continued)

FOREIGN PATENT DOCUMENTS

| | | |
|---|---|---|
| EP | 2199941 A2 | 6/2010 |
| EP | 2199941 A3 | 4/2012 |
| WO | 2010115959 A1 | 10/2010 |

OTHER PUBLICATIONS

International Search Report issued in corresponding international application No. PCT/US2011/062957 on Apr. 4, 2012.

(Continued)

*Primary Examiner* — Venkat Perungavoor

(57) ABSTRACT

Novel methods, components, and systems for automatically detecting malicious software are presented. More specifically, methods, components, and systems for the automated deployment of generic signatures to detect malicious software. Even more specifically, computer implemented methods for determining whether a software application is likely malicious including computing at a client component a generic fingerprint for a software application, transmitting the generic fingerprint data to a server component, receiving at the client component information from the server component relating to the generic fingerprint of the software application, and following a prescribed set of actions based on the information received from the server.

18 Claims, 6 Drawing Sheets

(56) References Cited

U.S. PATENT DOCUMENTS

| | | |
|---|---|---|
| 2009/0300761 A1 | 12/2009 | Park et al. |
| 2010/0017877 A1 | 1/2010 | Cooley et al. |
| 2010/0212010 A1* | 8/2010 | Stringer et al. ................. 726/22 |
| 2010/0281248 A1* | 11/2010 | Lockhart et al. .............. 713/150 |

OTHER PUBLICATIONS

International Search Report and Written Opinion in counterpart International Application No. PCT/US2011/062957, mailed Jun. 24, 2014, 8 pages.

* cited by examiner

METHOD AND APPARATUS FOR DETECTING MALICIOUS SOFTWARE USING GENERIC SIGNATURES

FIELD OF THE INVENTION

The present invention relates to the security of general purpose computing devices and more specifically to the detection of malicious software (malware) on a general purpose computing device.

BACKGROUND OF THE INVENTION

It is known in the art that each day, many tens of thousands of new malicious software programs are discovered. These programs can compromise the security of general computing devices. Possible security violations include, but are not limited to, the theft of data from the system, the usurping of the system for other nefarious purpose (like sending spam email), and, in general, the remote control of the system (by someone other than its owner) for other malicious actions.

One popular technique in the art for detecting malicious software comprises the following steps:
  a. Establishing through some independent means that the application is malicious (e.g., by having a human being manually analyze it and pinpoint the presence of one or more malicious behaviors).
  b. Computing a hash or fingerprint of this software. A hash is a mathematical transformation that takes the underlying binary contents of a software application and produces a relatively short string, with the idea being that two different applications will, with overwhelmingly high probability, have distinct fingerprint values. Common functions for performing this fingerprinting or hashing step include, but are not limited to, SHA-256, SHA-1, MD5, and others. Besides hash and fingerprint, another term used in the art to describe this transformation is a signature. For the purposes of this invention, the terms hash, fingerprint, and signature will be used interchangeably. These terms are not synonymous with each other, but for the purposes of the invention described, the differences are immaterial.
  c. Publishing this hash so that it is accessible to end-users operating a general purpose computing device (for example, the hash can be posted to a blacklist of known malicious applications).
  d. Having the device compare this published fingerprint with the fingerprint of any new software applications that have arrived on the system.
  e. Applying a set of steps based on a given policy if the fingerprints match (e.g., blocking the installation of the application).

The technique just described suffers from the drawback that it only works when an application is determined to be malicious ahead of time. Put differently, it is a reactive approach. It is understood in the art that often times superficial changes to a malicious application will cause it to have a different fingerprint even though the underlying actions of the application continue to be malicious. In other words, the application will look ostensibly different from the outside, but underneath its operations will be identical (analogous to how a criminal can put on different disguises involving wigs and sunglasses, even though underneath it is the same person). If the file is modified, then the corresponding fingerprint might change. If the fingerprint changes, then it will no longer match the one that was initially established for the application, and consequently the application can potentially evade detection by any anti-malware technology that uses a reactive signature-based approach. Indeed, the explosion in malware instances appears to be a result of malware authors making frequent and innocuous changes to a smaller number of applications rather than creating entirely new applications.

To address this issue, one technique in the art involves developing what are known as generic signatures. These signatures are designed to be invariant to superficial changes in the underlying binary contents of a software application. If a malicious party only performs a restricted set of superficial changes to the binary, then the resulting hash value will not change. For example, one way to construct a generic signature would be to do the following. First, extract out structural properties of the file (such as the sizes of the different sections, the number of symbols, the entropy of the various sections). Second, normalize these values or put them in buckets. For example, if the size is between 0 bytes and 100 bytes, then it would belong in bucket one. If the size is between 100 and 200 bytes, it would belong in bucket two, and so on. Now, rather than using the original file to construct a signature, we could use the normalized structural features as the basis of the signature. The idea is that superficial changes to the file would likely yield little to no changes to the underlying structure of the file, and after normalization or bucketing, you would see no changes.

Consequently, a single generic signature can be used not only to detect a given base threat, but also be used to detect minor variations of that threat. To give a physical analogy that might help make the concept of a signature more clear, imagine you are trying to describe a criminal. You could do so by identifying very specific characteristics (such as hair color, eye color, what they were wearing when last seen, etc.). However, if the criminal wore a wig or had colored contact lenses on, then characteristics like hair or eye color would not be useful. If instead, one were to focus on structural attributes, such as the criminal's height, weight, build, race, etc., then even in the presence of disguises these attributes would be constant. Furthermore, if one were to normalize these attributes (e.g., saying he is approximately 6 feet tall rather than exactly 6 feet and 2 inches, or saying the he is heavyset rather than specifying a very specific build), you could potentially identify the criminal even if they wore platform shoes and baggy clothing.

However, it is known in the art that even generic signatures have shortcomings. These shortcomings include, but are not limited to the following:
  a. Creating generic signatures might require manual intervention. (For example, a human computer virus analyst may have to directly examine the binary contents of the software application and determine how a signature should be computed so that it is invariant to innocuous changes in the applications.) In the context of the human criminal analogy listed above, one might have to identify exactly which attributes are interesting, and what range of values they should take.
  b. Generic signatures are prone to false positives (i.e., a situation in which they incorrectly identify an application as malicious, even though it is in fact benign). Since generic signatures are designed to identify not just a single base software application, but also other applications that are related to it, there is a risk that a legitimate application might inadvertently be identified as malicious because its underlying binary contents bear some similarity to the malicious application off of which the signature was based. In the context of the human criminal analogy given above, if we were too vague in the description—then every 6 foot tall heavy-set person might fit the description of the criminal.

There is, accordingly, a need in the art to develop methods, components, and systems for detecting malicious software through generic signatures that addresses the above limitations. Specifically, there is need for a system in which automation can be used to reduce the amount of manual analysis and furthermore, one would need to reduce the risk of false positives in the system.

SUMMARY OF THE INVENTION

According to one aspect of the present invention, a system is provided that can compute generic fingerprints for a given software application as well as determine if applications possessing that same generic fingerprint should be deemed malicious, in which case, a prescribed set of actions against that software would be taken.

According to another aspect of the present invention, a server-side component is provided that can perform the following steps: first, apply a mathematical transformation to a software application to produce a generic fingerprint; second, record the fingerprint of said software application; third, apply one or more steps that can be executed on a general purpose computing device to determine if that generic signature should be deemed malicious; and fourth, communicate that information to a client component.

According to another aspect of the present invention, a client-side component is provided that can: first, compute a generic fingerprint for a software application it encounters; second, transmit that generic fingerprint data to a server component (or can replicate those steps locally if it has knowledge of the server's relevant data and relevant logical operations); third, follow a prescribed set of actions provided by the server, such actions including, but not limited to: (1) Ignoring the application if it is deemed safe by other methods beyond the generic fingerprint; (2) Removing the application from the system if it is deemed unsafe; (3) transmitting the application to a possibly different server-side component for further processing and analysis.

According to another aspect of the present invention, a method is provided for identifying whether a given software application is a candidate for having a generic signature computed. In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

According to another aspect of the present invention, a method is provided for identifying whether an application possessing a given generic signature should be deemed malicious (or clean) primarily on the basis of possessing that signature value. In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

The subsequent description of the preferred embodiments of the present invention refers to the attached drawings, wherein.

DETAILED DESCRIPTION OF THE INVENTION

Figure 1:
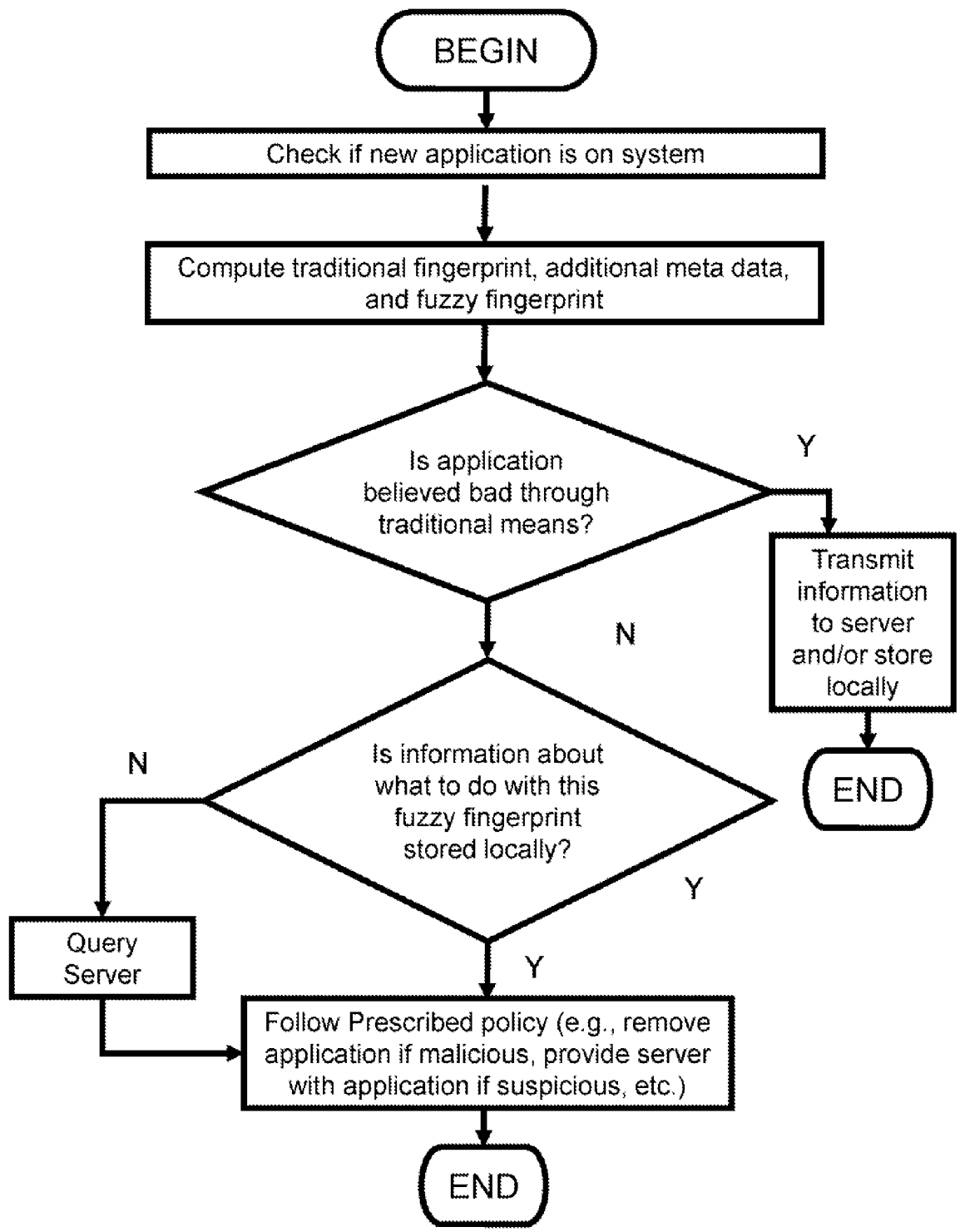
FIG. 1 represents a flowchart of the operation of a client in accordance with an embodiment of the present invention.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These descriptions and representations are the means used by those skilled in the data processing arts to most effectively convey the substance of their work to others skilled in the art. The steps described herein are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The descriptions presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The description that follows will reference terminology that is generally known in the art. In the art, the term malware refers to a malicious software application. Such an application can have a number of nefarious purposes. For example, malware can be used to perform a number of malicious actions. These actions include, but are not limited to: stealing digital information from a victim's machine; using the victim's machine in the perpetration of other malicious activities (such as sending out unsolicited email messages or spam); remotely controlling the victim's machine; and inhibiting the machine from operating normally. In the art, a computer virus is generally considered one example of malicious software. In addition to computer viruses, other types of malware in the art include Trojans, Worms, Downloaders, and Misleading Applications.

It is understood that the maliciousness of an application can be subjective; it often depends on the user and typically includes a well-defined set of rules. For the purposes of this disclosure, a malicious application shall be understood to mean an application that is unwelcome to the user.

In the art, the term false positive references a situation in which an otherwise legitimate application is accidentally deemed malicious. Similarly, a true positive references a situation in which a malicious application is correctly identified as such. It is therefore the objective of anti-malware software to achieve a high true positive rate while having a low false positive rate. In general, however, there is an inverse tradeoff between these two quantities. If an anti-malware technology is very aggressive and detects many threats, there is a greater chance it will have more false positives. Conversely, if an anti-malware technology is conservative and identifies fewer threats, it will lead to fewer false positives.

Anti-malware vendors therefore try to develop technology that will offer a favorable tradeoff between the false positive and true positive rates. If a legitimate critical business application is incorrectly identified as malicious, then it could cause significant financial damage to the customer. Therefore, false positives are highly undesirable. In some instances, a false positive is so undesirable that one is willing to accept a lower true positive rate to ensure a very low false positive rate.

In the art, the term signature references a relatively short sequence of values that can be used to identify if an application is malicious or not. In its most general incarnation, the signature is computed as a transformation applied to an entire software application. In the art, a signature is typically computed on a known piece of malware. The signature is either transmitted onto a client's system or it is stored on a server. When a client encounters a new piece of software, it will compute a signature on that software, and determine if that signature matches one associated with a known piece of malicious software either by checking its local data store or by querying a server. It is understood in the art that a signature can either be specific or generic. If two software applications have the same specific signature, then with overwhelming likelihood, these two applications are entirely identical. One example of a specific signature in the art is a SHA-256 hash. A generic signature differs from a specific signature in that it permits that possibility that variations on a given application will continue to have the same signature. If an application is taken, and superficial changes are made to it, then the generic signature on this application might continue to be the same as the original whereas a specific signature on it will with extremely high likelihood be different from that computed on the original.

In the art, the term fingerprint is often associated with a traditional signature and the term fuzzy fingerprint is often associated with a generic signature. A fuzzy fingerprint is a transformation whose input is a software application and whose output is a (preferably shorter) sequence of symbols. Ideally, a fuzzy fingerprint will have two properties. First, if two applications are very close in nature (e.g., one application can be derived from the other with a small set of superficial changes), then the respective fuzzy fingerprints of these applications should be identical. Second, if two applications are considerably different, then the fuzzy fingerprints of these applications should ideally be different. These properties are ideal properties, and a fuzzy fingerprint still has value even if both properties fail to hold in a plurality of instances. A fuzzy fingerprint is an instance of a generic signature, though not all approaches to computing generic signature would yield a corresponding fuzzy fingerprint. In particular, a fuzzy fingerprint can be used to identify if an application is malicious by seeing if the fuzzy fingerprint of this application coincides with a plurality of fuzzy fingerprints associated with known malicious software applications. Since slightly different applications can have the same fuzzy fingerprint value, it can serve as a generic signature. One example of a fuzzy fingerprint in the art is the PEhash. Another example of a fuzzy fingerprint in the art is ssdeep.

In the art, the term conviction refers to a situation in which a piece of software is identified as malicious on a client system.

In the art, the term digital signature refers to a standard technology for computing a relatively short string from a file using techniques from the field of public-key cryptography. The transformation to compute the string from the file requires the use of a so-called private signing key. A public verification can be used to determine if a purported signature on a file has been correctly computed. A secure signature scheme is such that without knowledge of the private signing key, it is computationally infeasible for one to compute a signature that will be construed as valid. A digital signature should not be confused with the types of signatures mentioned above for detecting malicious applications (even though in the art these notions all use the term "signature").

In one embodiment of the present invention, the client and server components would function as follows. The server would engage in an optional initialization phase wherein it would compute a fuzzy fingerprint on both known malicious and known clean files. These results would be stored in a data store such as a traditional database or even in a flat file. The algorithm for computing the fuzzy fingerprint could be any one known in the art, examples of which include PEHash and ssdeep. Alternatively, a manual or custom algorithm can also be employed. The choice of fingerprinting implementation does not impact the reduction to practice of the invention so long as the choice is consistent (i.e., the client and server use the same algorithm).

Figure 2:
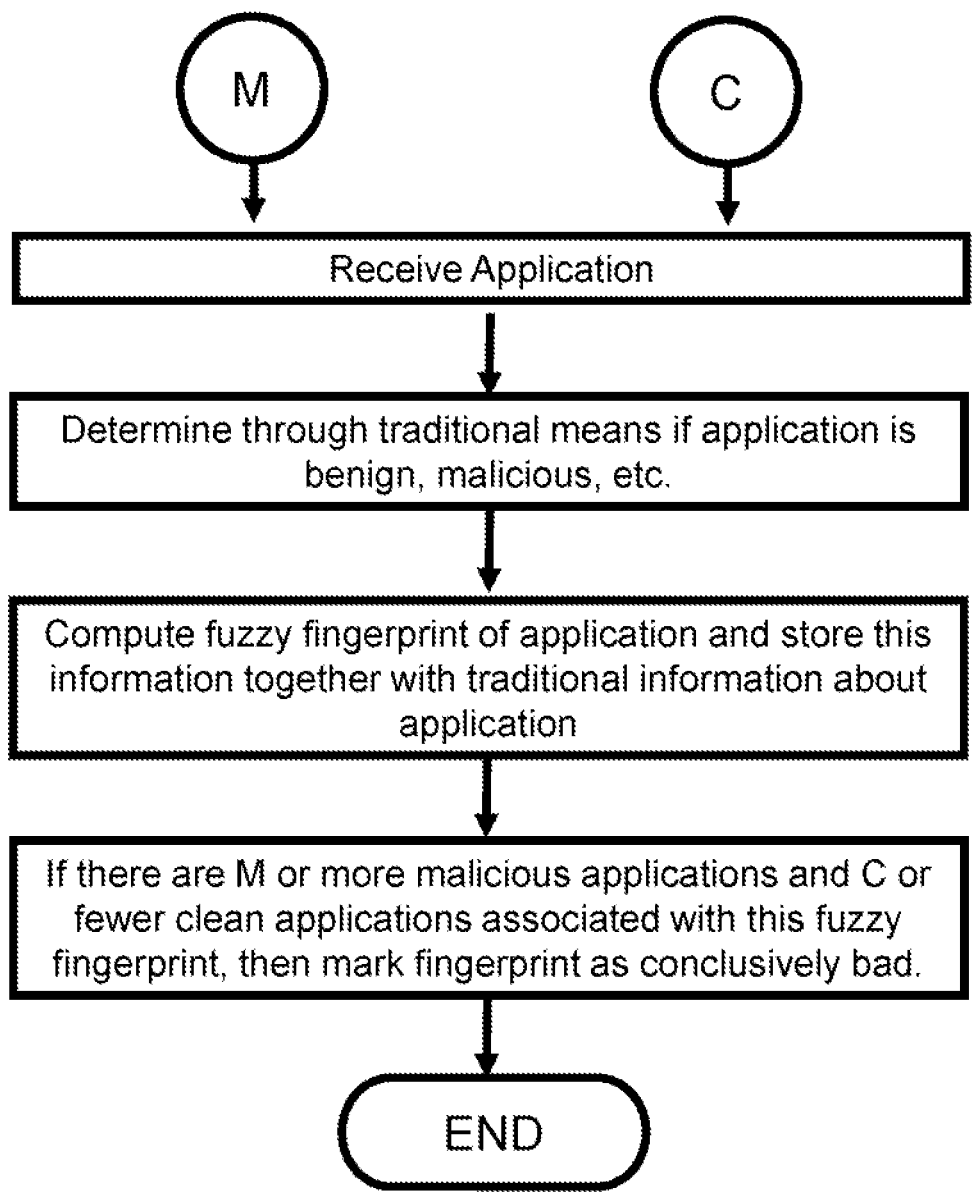
FIG. 2 represents a flowchart of a method for determining if a fuzzy fingerprint is conclusively bad in accordance with an aspect of the present invention.

As shown in FIG. 2, if the server has determined that there is sufficient evidence that the fuzzy fingerprint is conclusively bad (for example, if there is a large number of known malicious applications that have this same fingerprint and no known good applications that have this same fingerprint), then the fuzzy fingerprint can be marked conclusively bad. To assist in this determination, the server can maintain a data structure comprising fuzzy fingerprints associated with applications that are either known to be good or strongly believed to be good based on their attributes. Any software application whose fuzzy fingerprint is found in this data structure would preferably not be marked as conclusively bad. This disposition can be transmitted directly to a client (and stored locally on it) or can be stored on the server itself (to be made available should a client query for it), or some combination thereof.

Figure 3:
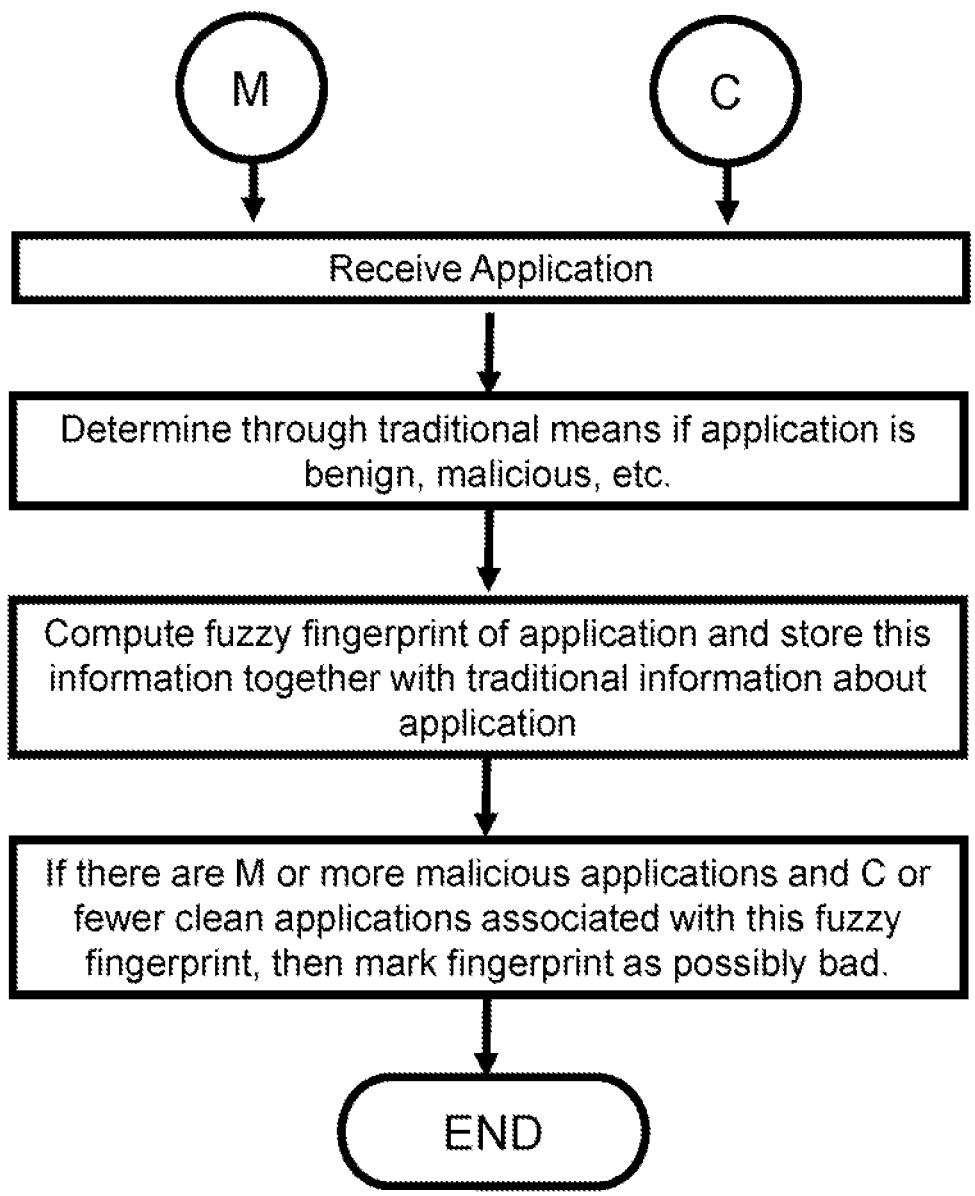
FIG. 3 represents a flowchart of a method for determining if a fuzzy fingerprint is possibly bad in accordance with an aspect of the present invention. Note that the steps of this method are largely identical to those for determining if an application is conclusively bad. The difference in the reduction to practice would be in the choice of values for the numeric parameters M and C. (To determine if an application is conclusively bad rather than just possibly bad, we would expect the value of M to be at least as big and the value of C to be at least as small.) It is expected that one of ordinary skill in the art can identify suitable values to use for these parameters.

As shown in FIG. 3, if the server has noticed that there is some evidence, but not yet conclusive evidence, that the fuzzy fingerprint might be bad (for example, there are no known good files with this same fuzzy fingerprint but there are one or more bad files, including the one just processed, with this fuzzy fingerprint), it can note that the fingerprint is possibly bad. If the server has noticed that there is some evidence, but not yet conclusive evidence, that the fuzzy fingerprint might be good (for example, there are some known good files with this same fuzzy fingerprint), it can note that the fingerprint is possibly good. Similarly, if the server has noticed that there are both good and bad applications associated with a particular fuzzy fingerprint, it can classify the fingerprint as conflicted.

As shown in FIG. 1, when a client encounters a new file, it could first optionally use standard techniques in the art to determine if the application poses a threat. The steps to do so would optionally include computing a traditional fingerprint (e.g., a SHA-2, an MD5, or other technique known in the art) of the application and optionally gathering other metadata that can be used to determine (possibly with the help of a remote server) whether a file is malicious.

The client would also compute a fuzzy fingerprint of the application. It can optionally look up the fuzzy fingerprint in its local data store to determine if it is known to be malicious, and if so, take an appropriate action. Otherwise, it can query a remote server and provide it with the fuzzy fingerprint value, and any other data collected about the application, such as the traditional fingerprint and other file metadata.

The server, in turn, can record the information it receives. If the fingerprint has been deemed conclusively bad (using the information that the server already stored possibly with the information it just received about the application), then the server can inform the client of this distinction. The client can then take an appropriate action (in one embodiment of the present invention, this action could involve outright deleting the application or otherwise blocking a user from installing it). If the fingerprint has been deemed possibly bad, then the server can inform the client of this distinction. The client can then take an appropriate action (in one embodiment of the present invention, this action could involve providing the server with an actual copy of the software application for further analysis).

In one embodiment of the present invention, the server can put a number of safeguards in place to reduce the risk that a given application is called malicious. These safeguards can include, but are not limited to the following. First, if the application is known to be good through a more direct means (such as the traditional fingerprint, like a SHA-256, matching one on a known whitelist of good software applications), then the server can override the fuzzy fingerprint distinction. Second, the use of the fuzzy fingerprint can be throttled. For example, the server can limit the number of convictions associated with this fingerprint to a modest number like 5. Along similar lines, convictions based on fuzzy fingerprints can be limited to situations where the popularity of the application of interest is below a certain threshold. In this scenario, a parameter N can be introduced into the system and an application would only be convicted if fewer than N systems appear to have this application. This restriction would ensure that if there is a mistake, its damage would at least be contained. It is also known in the art that malicious files tend to be less popular than benign ones. Therefore if a file is popular, one would have to be more careful if convicting it. Third, convictions with a fuzzy fingerprint could be restricted to certain classes of files that have a slightly higher likelihood of being malicious. For example, it is known in the art that files with a smaller size have a higher likelihood of being malicious compared to larger files. This is the case since malicious parties have a higher chance of success of transmitting a smaller file onto a victim's machine. It is also known in the art that digitally signed files have a smaller likelihood of being malicious compared to digitally unsigned files. Similar considerations can apply for other file attributes as well. Therefore, in one embodiment of the present invention, fuzzy fingerprint based convictions can be optionally restricted specifically to software applications whose size is below a certain threshold and that are not digitally signed. Fourth, convictions with a fuzzy fingerprint can be reserved for specific situations. In one embodiment of the present invention, if a machine has a propensity for getting infected with a specific threat (for example, it has encountered this type of threat previously or it is in a geographic region associated with a particular threat), then we can apply a fuzzy fingerprint to such cases.

In one embodiment of the present invention, the server can make an independent determination about whether a particular fuzzy fingerprint corresponds to a malicious or clean file. In this case, the server can rely on third-party knowledge, such as the presence of a plurality of software applications from collections of known malware that have a certain fuzzy fingerprint. Alternatively, the server can look for the presence of a plurality of software applications from collections of known clean files that have a certain fuzzy fingerprint. Finally, the server can examine user log data to determine the likelihood that applications are malicious or clean. In particular, if an application with a particular fuzzy fingerprint is very popular, but not otherwise known to be malicious, then it is generally very likely that the application is in fact benign. In this case, it would be risky to call applications with this same fuzzy hash value malicious.

Example 1

Example 1 is provided to illustrate one aspect of the invention. This example illustrates one possible work flow according to the invention and is intended to help make the invention more clear. It is not meant to restrict the invention in any way since there are numerous variations not described in Example 1 that nevertheless fall within the scope of the overall invention, but which are left out of the Example 1 to avoid obscuring it.

Figure 4:
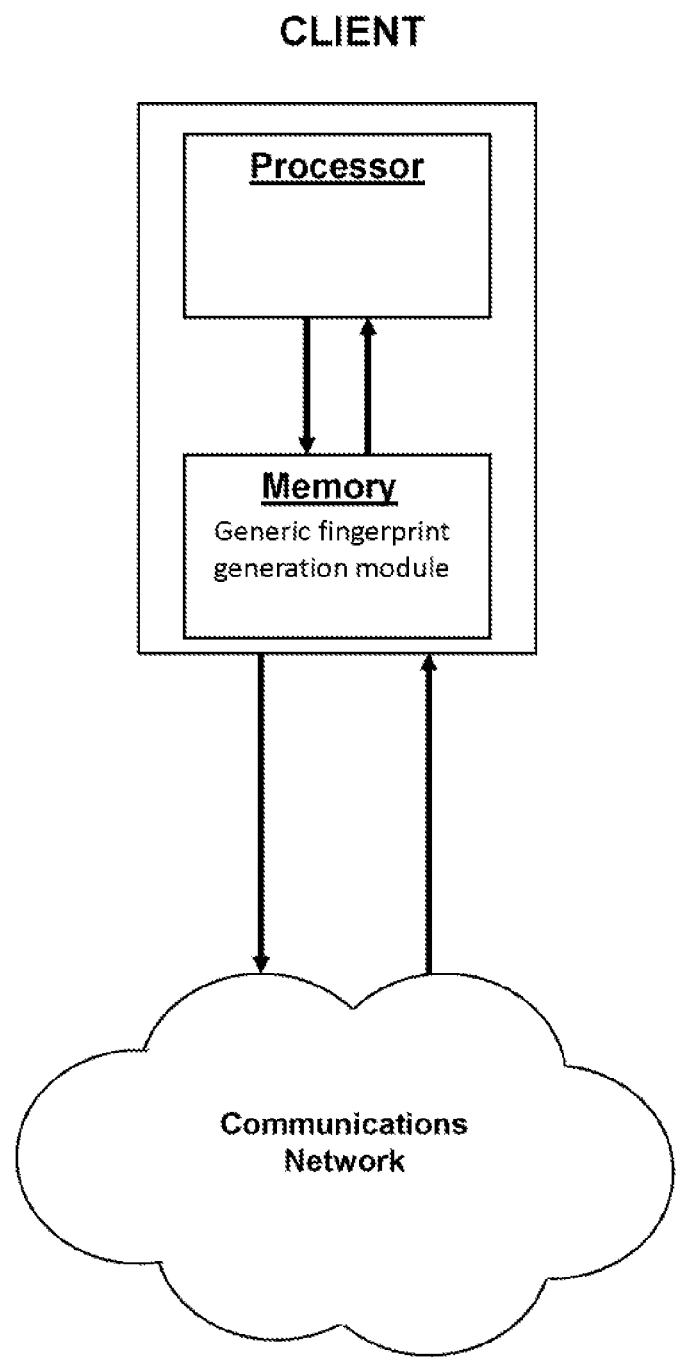
FIG. 4 is a client component including a generic fingerprint module in accordance with an embodiment of the present invention e.
Figure 5:
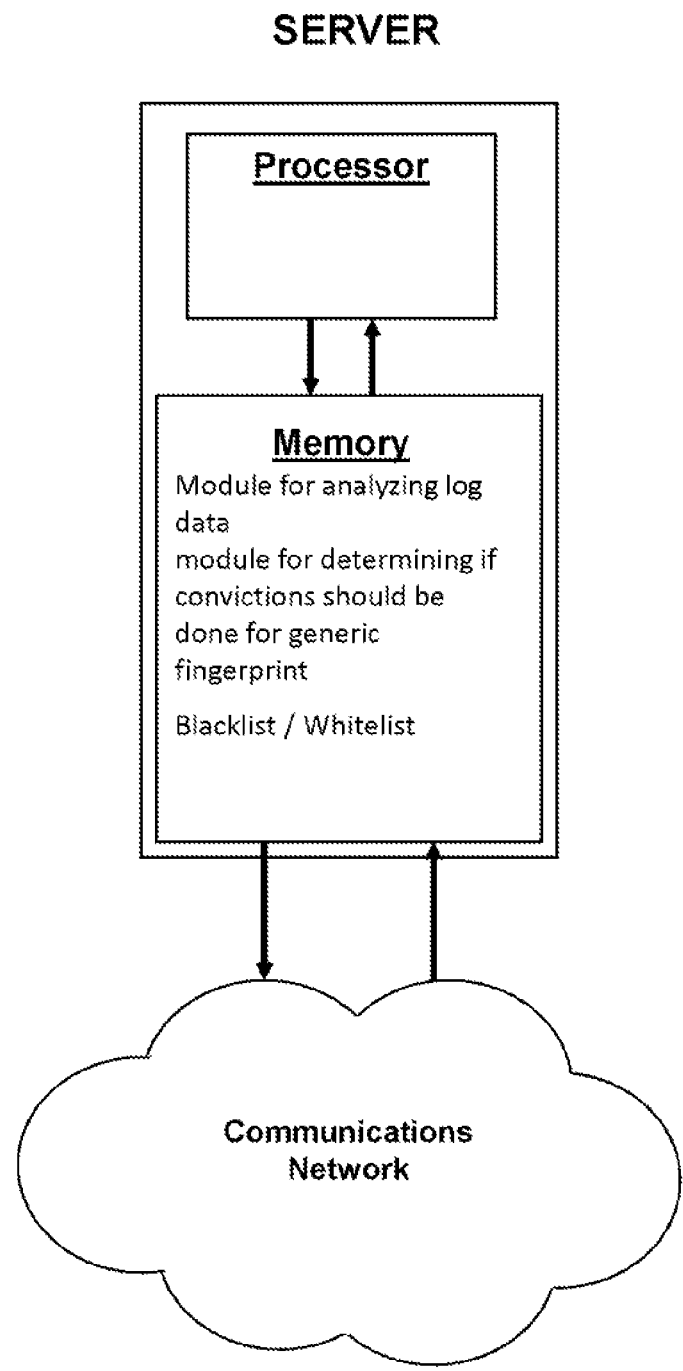
FIG. 5 is a server component including a module for analyzing log data for determining if convictions should be made for generic fingerprints in accordance with an embodiment of the present invention f.

According to Example 1, a client and a server are provided (see, e.g., FIGS. 4 and 5). A new software application arrives on the client. The client computes both a generic and specific fingerprint on this file and transmits it to the server. The server examines both of these fingerprints. If from these two pieces of information alone, it knows the application to be either conclusively good or bad (e.g., the file is on a known blacklist or whitelist), then the server will return this disposition.

If no conclusive determination can be made from either of these two pieces of information, then the server will look up every specific fingerprint it has seen in the past associated with the generic fingerprint sent up in the query. (Note that because multiple distinct files can have the same generic fingerprint, it is possible that we will have multiple specific fingerprints that can be associated with the same generic fingerprint.) For simplicity, imagine that we have the following fingerprints in our queries: (G, S0), (G, S2), (G, S3), . . . , (G, S9), where S1, . . . , S9 are distinct specific fingerprints all of which correspond to the same generic fingerprint G. Now, suppose a threshold of these specific fingerprints are malicious (e.g., imagine that S0, . . . , S7 all correspond to known malware). Further, suppose that none of these specific fingerprints seen in the past is associated with a known benign file (i.e., a file on a whitelist). In other words, S8 and S9 have previously unknown disposition (i.e., they could be malicious or benign—but no one has made a determination yet). In that case, a pattern emerges. The vast majority of the specific fingerprints associated with the generic fingerprint G appear to be malicious. In this case, it seems reasonable to draw the conclusion that the generic fingerprint itself should be marked as malicious.

The server, following this line of steps, will mark the generic fingerprint "G" as malicious and return the corresponding answer to the client.

Note that while we described the decision making process as happening in real time (i.e., on the fly), in practice, it can happen separately. In other words, a software module on the server can periodically go through logs of previous queries, and attempt to pick out generic fingerprints that appear to be malicious because the overwhelming majority of the specific fingerprints associated with them appear to be malicious. These generic fingerprints can then, as such, be marked malicious.

In this manner, when the server is asked to make a decision, it can simply perform a look-up rather than trying to perform the computation on the fly. At the same time, this approach will not leverage any relevant information gathered since the last time the logs were analyzed.

Figure 6:
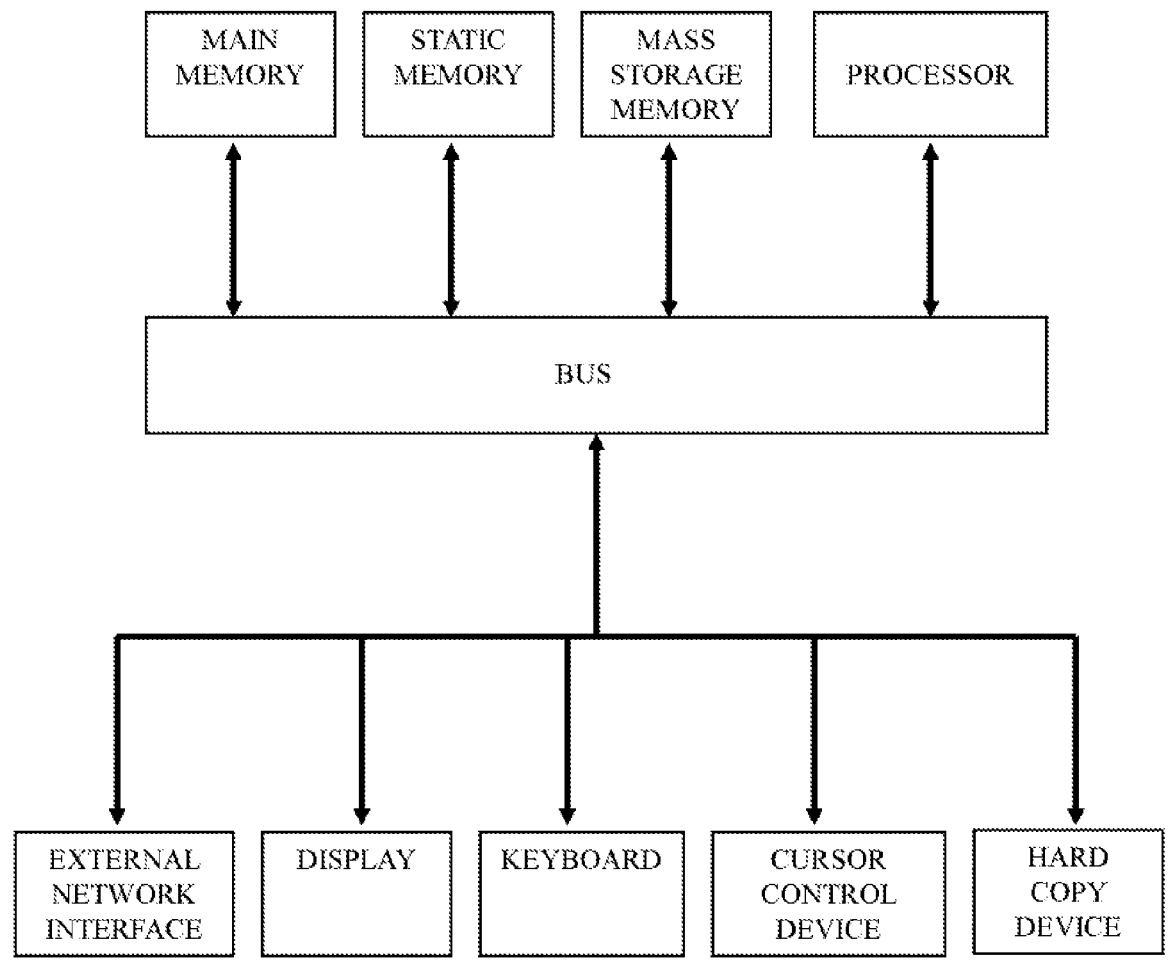
FIG. 6 is an exemplary computer system.

FIG. 6 is a block diagram of an exemplary computer system that may perform one or more of the operations described herein. Referring to FIG. 6, the computer system may comprise an exemplary client or server computer system. The computer system comprises a communication mechanism or bus for communicating information, and a processor coupled with a bus for processing information. The processor includes a microprocessor, but is not limited to a microprocessor, such as, for example, Pentium, PowerPC, Alpha, etc. The system further comprises a random access memory (RAM), or other dynamic storage device (referred to as main memory) coupled to the bus for storing information and instructions to be executed by the processor. Main memory also may be used for storing temporary variables or other intermediate information during execution of instructions by the processor.

The computer system also comprises a read only memory (ROM) and/or other static storage device coupled to the bus for storing static information and instructions for the processor, and a data storage device, such as a magnetic disk or optical disk and its corresponding disk drive. The data storage device is coupled to the bus for storing information and instructions. The computer system may further be coupled to a display device, such as a cathode ray tube (CRT) or liquid crystal display (CD), coupled to the bus for displaying information to a computer user. An alphanumeric input device, including alphanumeric and other keys, may also be coupled to the bus for communicating information and command selections to the processor. An additional user input device is cursor control, such as a mouse, trackball, track pad, stylus, or cursor direction keys, coupled to the bus for communicating direction information and command selections to the processor, and for controlling cursor movement on the display. Another device that may be coupled to the bus is a hard copy device, which may be used for printing instructions, data, or other information on a medium such as paper, film, or similar types of media. Furthermore, a sound recording and playback device, such as a speaker and/or microphone may optionally be coupled to the bus for audio interfacing with the computer system. Another device that may be coupled to the bus is a wired/wireless communication capability to communication to a phone or handheld palm device.

Note that any or all of the components of the system and associated hardware may be used in the present invention. However, it can be appreciated that other configurations of the computer system may include some or all of the devices.

The invention claimed is:

1. A computer implemented method for determining whether a software application is likely malicious, comprising:
receiving, at a server component, both a specific fingerprint and a generic fingerprint computed at a client component for a software application received at the client component;
storing, at the server component, a blacklist comprising a plurality of specific fingerprints of software applications known to be malicious;
storing, at the server component, a data structure comprising a plurality of known generic fingerprints and, for each known generic fingerprint, a set of specific fingerprints associated with the known generic fingerprint;
determining whether the software application is conclusively malicious by comparing the received specific fingerprint to the blacklist of specific fingerprints;
in the event the software application is not determined to be conclusively malicious from comparing the received specific fingerprint to the blacklist of specific fingerprints, determining that the software application is conclusively malicious in response to the number of malicious specific fingerprints associated with one of the known generic fingerprints that matches the received generic fingerprint exceeding a predetermined threshold; and transmitting to the client component an indication of whether the software application is malicious or benign from processing the received specific fingerprint and the received generic fingerprint.

2. A non-transitory computer readable storage medium, provided at a server component, encoded with software comprising computer executable instructions and when the software is executed operable to:

receive both a specific fingerprint and a generic fingerprint computed at a client component for a software application received at the client component;

store in a memory a blacklist comprising a plurality of specific fingerprints of software applications known to be malicious;

store in the memory a data structure comprising a plurality of known generic fingerprints and, for each known generic fingerprint, a set of specific fingerprints associated with the known generic fingerprint;

determine whether the software application is conclusively malicious by comparing the received specific fingerprint to the blacklist of specific fingerprints;

in the event the software application is not determined to be conclusively malicious from comparing the received specific fingerprint to the blacklist of specific fingerprints, determine that the software application is conclusively malicious in response to the number of malicious specific fingerprints associated with one of the known generic fingerprints that matches the received generic fingerprint exceeding a predetermined threshold; and transmit to the client component an indication of whether the software application is malicious or benign from processing the received specific fingerprint and the received generic fingerprint.

3. An apparatus, comprising:

a memory configured to store a blacklist comprising a plurality of specific fingerprints of software applications known to be malicious and to store a data structure comprising a plurality of known generic fingerprints and, for each known generic fingerprint, a set of specific fingerprints associated with the known generic fingerprint; and a processor configured to:

receive both a specific fingerprint and a generic fingerprint computed at a client component for a software application received at the client component;

determine whether the software application is conclusively malicious by comparing the received specific fingerprint to the blacklist of specific fingerprints;

in the event the software application is not determined to be conclusively malicious from comparing the received specific fingerprint to the blacklist of specific fingerprints, determine that the software application is conclusively malicious in response to the number of malicious specific fingerprints associated with one of the known generic fingerprints that matches the received generic fingerprint exceeding a predetermined threshold; and transmit to the client component an indication of whether the software application is malicious or benign from processing the received specific fingerprint and the received generic fingerprint.

4. The computer implemented method according to claim 1, wherein:

in the event the software application is not determined to be conclusively malicious from comparing the received specific fingerprint to the blacklist of specific fingerprints, determining that the software application is possibly malicious in response to the number of malicious specific fingerprints associated with the known generic fingerprint that matches the received generic fingerprint being one or more but being less than the predetermined threshold.

5. The computer implemented method according to claim 1, further comprising:

storing, at the server component, a whitelist comprising a plurality of specific fingerprints of software applications known to be benign;

determining whether the software application is conclusively benign by comparing the received specific fingerprint to the whitelist of specific fingerprints; and transmitting to the client component an indication that software application is benign in response to determining that the specific fingerprint is conclusively benign.

6. The computer implemented method according to claim 5, wherein the determination of whether the software application is conclusively malicious based on the received generic fingerprint is performed only in the event the software application is determined neither to be conclusively benign nor conclusively malicious from comparing the received specific fingerprint to the whitelist and blacklist of specific fingerprints.

7. The computer implemented method according to claim 5, wherein:

in the event the software application is determined neither to be conclusively benign nor conclusively malicious from comparing the received specific fingerprint to the whitelist and blacklist of specific fingerprints, determining whether the software application is conclusively benign in response to the number of benign specific fingerprints associated with the known generic fingerprint that matches the received generic fingerprint exceeding another predetermined threshold and none of the specific fingerprints associated with the known generic fingerprint that matches the received generic fingerprint being malicious.

8. The computer implemented method according to claim 5, wherein:

in the event the software application is determined neither to be conclusively benign nor conclusively malicious from comparing the received specific fingerprint to the whitelist and blacklist of specific fingerprints, determining whether the software application is possibly benign in response to one or more specific fingerprints associated with the known generic fingerprint that matches the received generic fingerprint being benign.

9. The non-transitory computer readable storage medium according to claim 2, further comprising computer executable instructions operable to:

determine, in the event the software application is not determined to be conclusively malicious from comparing the received specific fingerprint to the blacklist of specific fingerprints, that the software application is possibly malicious in response to the number of malicious specific fingerprints associated with the known generic fingerprint that matches the received generic fingerprint being one or more but being less than the predetermined threshold.

10. The non-transitory computer readable storage medium according to claim 2, further comprising computer executable instructions operable to:
- store a whitelist comprising a plurality of specific fingerprints of software applications known to be benign;
- determine whether the software application is conclusively benign by comparing the received specific fingerprint to the whitelist of specific fingerprints; and
- transmit to the client component an indication that software application is benign in response to determining that the specific fingerprint is conclusively benign.

11. The non-transitory computer readable storage medium according to claim 10, wherein the computer executable instructions that determine whether the software application is conclusively malicious based on the received generic fingerprint are executed only in the event the software application is determined neither to be conclusively benign nor conclusively malicious from the computer executable instructions that compare the received specific fingerprint to the whitelist and blacklist of specific fingerprints.

12. The non-transitory computer readable storage medium according to claim 10, further comprising computer executable instructions operable to:
- determine, in the event the software application is determined neither to be conclusively benign nor conclusively malicious from comparing the received specific fingerprint to the whitelist and blacklist of specific fingerprints, whether the software application is conclusively benign in response to the number of benign specific fingerprints associated with the known generic fingerprint that matches the received generic fingerprint exceeding another predetermined threshold and none of the specific fingerprints associated with the known generic fingerprint that matches the received generic fingerprint being malicious.

13. The non-transitory computer readable storage medium according to claim 10, further comprising computer executable instructions operable to:
- determine, in the event the software application is determined neither to be conclusively benign nor conclusively malicious from comparing the received specific fingerprint to the whitelist and blacklist of specific fingerprints, whether the software application is possibly benign in response to one or more specific fingerprints associated with the known generic fingerprint that matches the received generic fingerprint being benign.

14. The apparatus according to claim 3, wherein the processor is further configured to determine, in the event the software application is not determined to be conclusively malicious from comparing the received specific fingerprint to the blacklist of specific fingerprints, that the software application is possibly malicious in response to the number of malicious specific fingerprints associated with the known generic fingerprint that matches the received generic fingerprint being one or more but being less than the predetermined threshold.

15. The apparatus according to claim 3, wherein the processor is further configured to:
- store a whitelist comprising a plurality of specific fingerprints of software applications known to be benign;
- determine whether the software application is conclusively benign by comparing the received specific fingerprint to the whitelist of specific fingerprints; and
- transmit to the client component an indication that software application is benign in response to determining that the specific fingerprint is conclusively benign.

16. The apparatus according to claim 15, wherein the processor is further configured to determine whether the software application is conclusively malicious based on the received generic fingerprint only in the event the software application is determined neither to be conclusively benign nor conclusively malicious from comparing the received specific fingerprint to the whitelist and blacklist of specific fingerprints.

17. The apparatus according to claim 15, wherein the processor is further configured to:
- determine, in the event the software application is determined neither to be conclusively benign nor conclusively malicious from comparing the received specific fingerprint to the whitelist and blacklist of specific fingerprints, whether the software application is conclusively benign in response to the number of benign specific fingerprints associated with the known generic fingerprint that matches the received generic fingerprint exceeding another predetermined threshold and none of the specific fingerprints associated with the known generic fingerprint that matches the received generic fingerprint being malicious.

18. The apparatus according to claim 15, wherein the processor is further configured to:
- determine, in the event the software application is determined neither to be conclusively benign nor conclusively malicious from comparing the received specific fingerprint to the whitelist and blacklist of specific fingerprints, whether the software application is possibly benign in response to one or more specific fingerprints associated with the known generic fingerprint that matches the received generic fingerprint being benign.

* * * * *